(12) United States Patent
Yoshida et al.

(10) Patent No.: US 7,905,248 B2
(45) Date of Patent: Mar. 15, 2011

(54) STRAINER AND CONTROL VALVE (75) Inventors: Hiroyuki Yoshida, Anjo (JP); Haruki Yamamoto, Anjo (JP); Kazunori Ishikawa, Anjo (JP)

(73) Assignee: Aisin AW Co., Ltd. (JP)

( * ) Notice: Subject to any disclaimer, the term of this patent is extended or adjusted under 35 U.S.C. 154(b) by 525 days.

(21) Appl. No.: 11/884,271

(22) PCT Filed: Aug. 29, 2005

(86) PCT No.: PCT/JP2005/015654
§ 371 (c)(1),
(2), (4) Date: Mar. 27, 2008

(87) PCT Pub. No.: WO2006/098048
PCT Pub. Date: Sep. 21, 2006

(65) Prior Publication Data
US 2008/0223778 A1    Sep. 18, 2008

(30) Foreign Application Priority Data

Mar. 16, 2005   (JP) ................................. 2005-074799

(51) Int. Cl.
  *B01D 35/04*   (2006.01)
  *F16K 51/00*   (2006.01)
(52) U.S. Cl. .................. 137/550; 210/418; 210/429
(58) Field of Classification Search .................. 137/544, 137/550; 210/418, 429, 430, 431
See application file for complete search history.

(56) References Cited

U.S. PATENT DOCUMENTS

| | | | | |
|---|---|---|---|---|
| 1,173,157 A * | 2/1916 | Allen | ............................ | 137/550 |
| 3,006,371 A * | 10/1961 | Giles | ............................. | 137/550 |
| 3,097,660 A * | 7/1963 | Priesmeyer | ................... | 137/550 |
| 5,062,454 A * | 11/1991 | Ichihashi et al. | ............. | 137/550 |
| 7,000,633 B2 * | 2/2006 | Okada et al. | ................. | 137/550 |
| 7,040,874 B1 * | 5/2006 | Martin et al. | ................ | 417/407 |
| 2003/0226593 A1 | 12/2003 | Okada et al. | | |

FOREIGN PATENT DOCUMENTS

| | | |
|---|---|---|
| JP | 05-306783 | 11/1993 |
| JP | 2000266235 A * | 9/2000 |
| JP | 2001-041349 | 2/2001 |
| JP | 3324140 | 9/2002 |
| JP | 2004-150444 | 5/2004 |

* cited by examiner

*Primary Examiner* — John Rivell
(74) *Attorney, Agent, or Firm* — Bacon & Thomas, PLLC (57) ABSTRACT

The present invention prevents foreign matter from infiltrating into a control valve and enables reduction in the cost of the valve. A strainer is mounted on an attachment portion of a valve sleeve, and a valve spool is disposed in the sleeve so as to be free to slidably advance and retreat. The strainer includes engagement portions m1 contacting first contact sites $\epsilon 1$ and $\epsilon 2$ formed on the attachment portion and a contact portion contacting second contact sites $\epsilon 3$ and $\epsilon 4$ formed on the attachment portion. Since the strainer includes the engagement portions m1 in contact with the first contact sites $\epsilon 1$ and $\epsilon 2$ and the contact portion in contact with the second contact sites $\epsilon 3$ and $\epsilon 4$, the sleeve has sufficient sealing contact with the strainer 73 at the first and second contact sites $\epsilon 1$ to $\epsilon 4$.

13 Claims, 7 Drawing Sheets

STRAINER AND CONTROL VALVE

TECHNICAL FIELD

The present invention relates to a strainer and a control valve.

BACKGROUND ART

Conventionally, a hydraulic circuit of an automatic transmission is provided with various control valves, such as a pressure control valve for controlling pressure, a flow control valve for controlling flow rate, and a direction control valve for controlling flow direction, for example, and by manipulating these control valves, oil is supplied to a hydraulic servo, thereby engaging a clutch, a brake, or the like, to change gear ratio (shift speed).

Each control valve includes a sleeve, a spool mounted so as to be freely slidable within the sleeve, a spring for urging the spool in one direction, and if necessary, a solenoid may also be provided for selectively moving the spool. The sleeve is formed with ports such as an inlet port for supplying oil to the control valve and an outlet port for discharging the oil from the control valve, and, when incorporated into a valve body, flow passages within in the valve body are in communication with each of the ports.

When foreign matter such as iron powder infiltrates a gap between the sleeve and the spool, it may cause the control valve to lock or damage the control valve. Therefore, to cover the ports, a strainer or filter structure is attached to the exterior of a strainer attachment portion of the sleeve, and the ports are sealed by tightly fitting the inner peripheral surface of the strainer over the outer peripheral surface of the strainer attachment portion, whereby foreign matter is prevented from infiltrating the valve. See, for example, Japanese Patent Application Publication No. JP-A-2001-41349 and Japanese Examined Patent Publication No. 3324140.

DISCLOSURE OF THE INVENTION

Problems to be Solved by the Invention

However, in the conventional control valve described above, a gap communicating with the port may be formed between the strainer and the strainer attachment portion if the inner peripheral surface of the strainer and the outer peripheral surface of the strainer attachment portion cannot be fitted together sufficiently tight, and foreign matter may infiltrate the control valve through that gap. To improve the seal, the tolerance between the radial dimension and axial dimension of the strainer and the axial dimension and radial dimension of the strainer attachment portion may be strictly set. In this case, however, the yield of strainers and sleeves meeting specifications is correspondingly lowered, and the cost of the control valve is increased.

An object of the present invention is to provide a strainer and a control valve that solves the problems of the conventional control valve described above so as to prevent foreign matter from infiltrating into the control valve and to simultaneously enable a reduction in cost.

Means for Solving the Problems

The strainer of the present invention is mounted on a strainer attachment portion ("strainer receiver" or "mount") of a main valve body. The main valve body has a sleeve with a port, with the strainer attachment portion surrounding the port, and a spool mounted so as to be freely slidable within the sleeve.

The strainer of the present invention includes engagement portions contacting first contact sites on the strainer mount and contact portions contacting second contact sites on the strainer mount.

A control valve of the present invention has a sleeve formed with a port and a strainer attachment portion around the port, a spool which is free to advance and retreat slidably within the sleeve, and a strainer attached to the strainer attachment portion.

The strainer includes engagement portions contacting first contact sites on the strainer attachment portion, and contact portions contacting second contact sites formed on the strainer attachment portion.

Preferably, the engagement portions are formed at each of opposing ends of the strainer, and the contact portion is formed at a predetermined location between the two ends of the strainer. Further, the first contact sites on the sleeve are formed on tapered surfaces.

Preferably, in the control valve of the present invention, the positions of the first and second contact sites are set such that vectors of respective pressing forces, by which the strainer presses against the first and second contact sites, oppose each other from opposite sides of the port.

The angle of the tapered surface determines the retaining force generated by the vector of the pressing force by which the strainer presses against the strainer attachment portion.

In a preferred embodiment of the present invention, the strainer includes a filter portion made by chemical or laser etching of a metallic material.

In another preferred aspect of the present invention, reinforcement ribs are formed on the engagement portions of the strainer.

In yet another preferred aspect of the present invention, at least one reinforcement rib is formed in a central part of the circumference of the strainer.

DESCRIPTION OF THE PREFERRED EMBODIMENTS

Preferred embodiments of the present invention are described below with reference to the drawings. In the description which follows the pressure control valve is exemplified by a linear solenoid valve.

FIGS. 1-6 show a linear solenoid valve 10 according to a first embodiment of the present invention. The linear solenoid valve 10 is connected to a line pressure oil passage or the like in a hydraulic circuit of an automatic transmission via a regulator valve, not shown in the drawing. Oil pressure from an oil pump is regulated by the regulator valve, and this regulated pressure is supplied to the linear solenoid valve 10 as input pressure. The linear solenoid valve 10 is activated by current supplied by a control device, not shown in the drawing, to generate an oil pressure corresponding to the current as a predetermined output pressure (pilot pressure), and to supply the output pressure to a hydraulic servo as control pressure. The hydraulic servo operates to engage and disengage a friction engagement element which is a clutch in this embodiment. The control pressure is supplied to the hydraulic servo according to a predetermined hydraulic pressure pattern for engagement and disengagement of the clutch. Alternatively, the friction engagement element may be a brake instead of a clutch. Also, a modulated pressure from a modulator valve may be supplied to the linear solenoid valve 10 instead of the regulated pressure.

Figure 1:
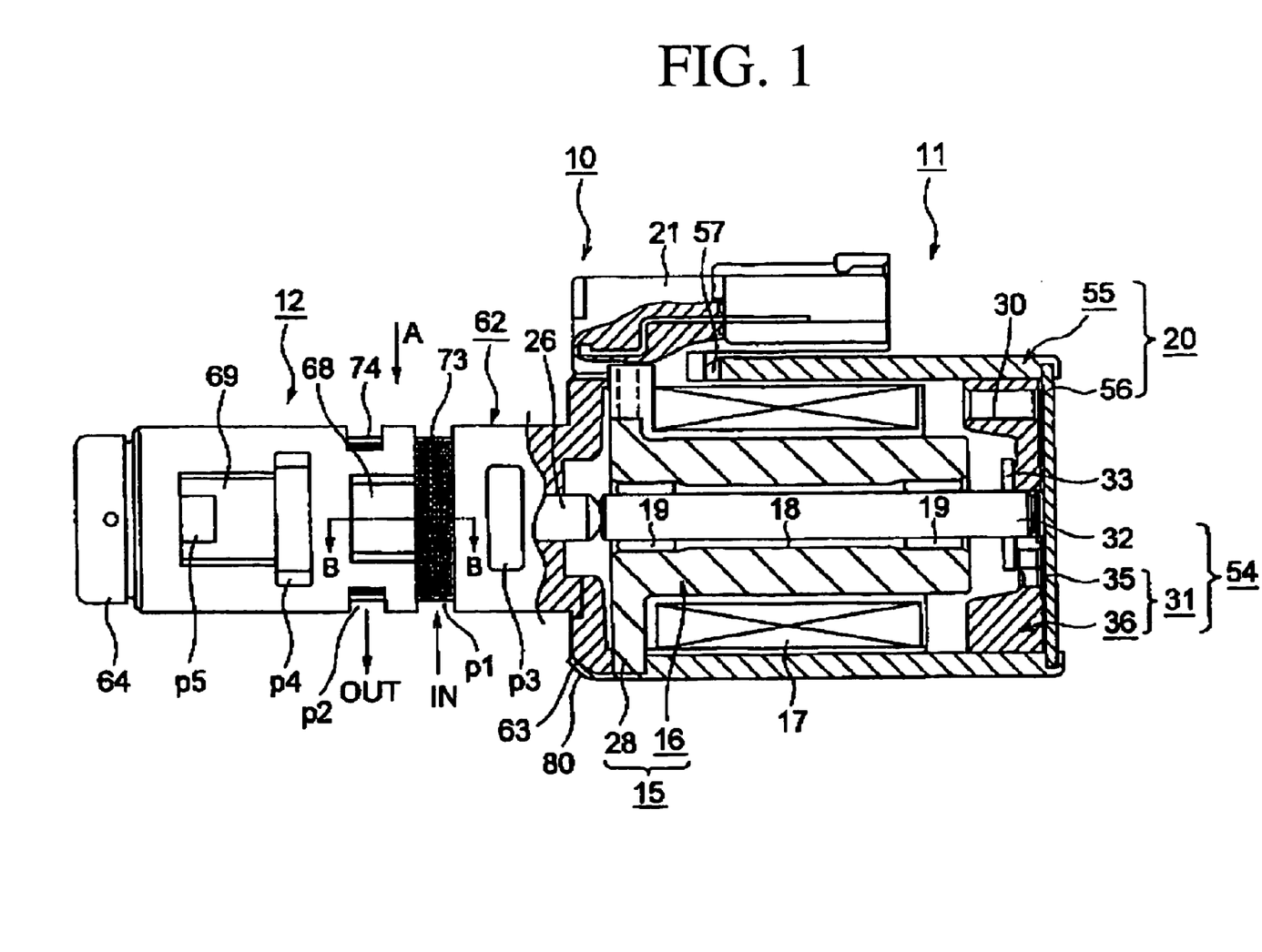
FIG. 1 is a front view of a linear solenoid valve according to a first embodiment of the present invention.
Figure 2:
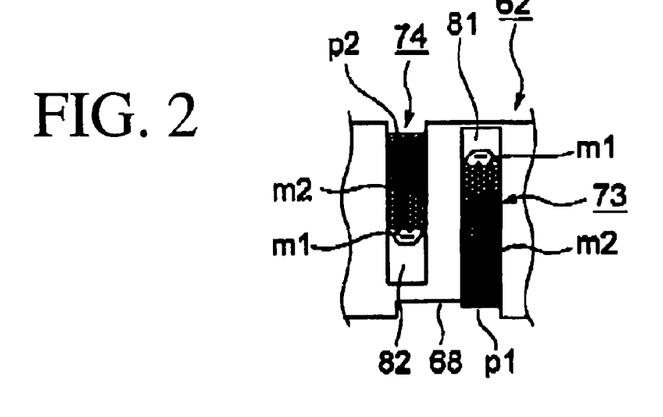
FIG. 2 is a partial plan view showing ports of a pressure regulating valve portion according to the first embodiment of the present invention.
Figure 3:
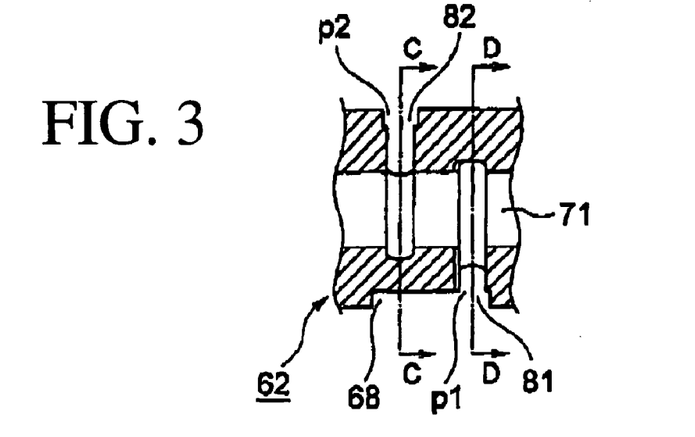
FIG. 3 is a cross-sectional view taken along line B-B in FIG. 1.
Figure 4:
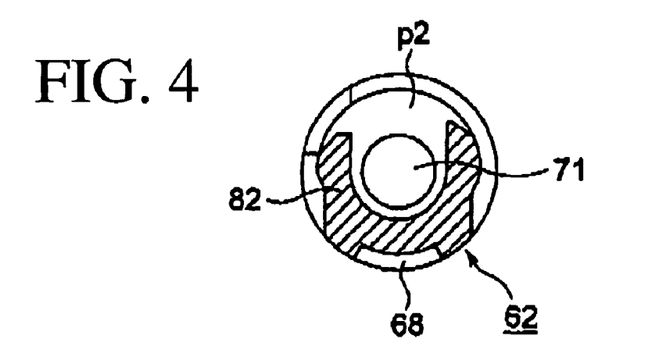
FIG. 4 is a cross-sectional view taken along line C-C in FIG. 3.
Figure 5:
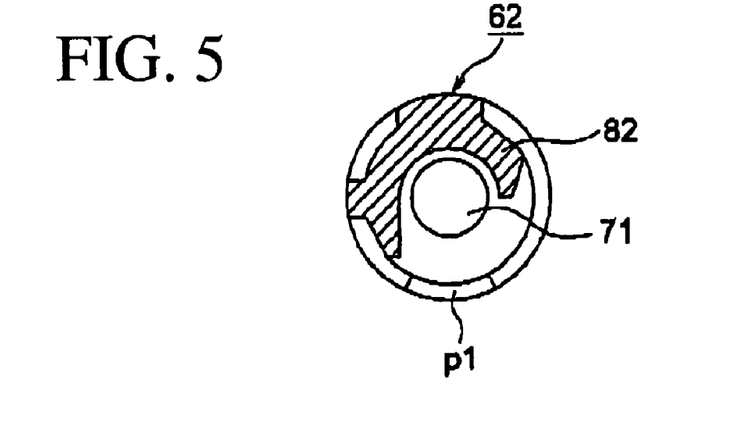
FIG. 5 is a cross-sectional view taken along line D-D in FIG. 3.
Figure 6:
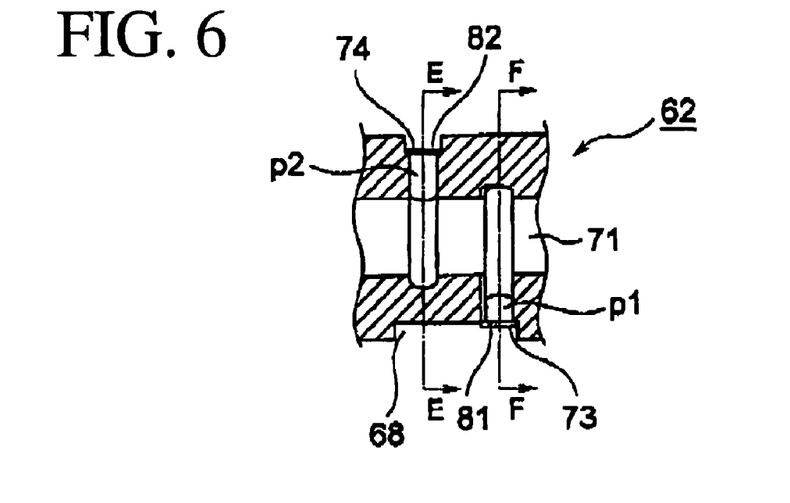
FIG. 6 is a partial sectional view showing the port structure of the pressure regulating valve portion according to the first embodiment of the present invention.
Figure 7:
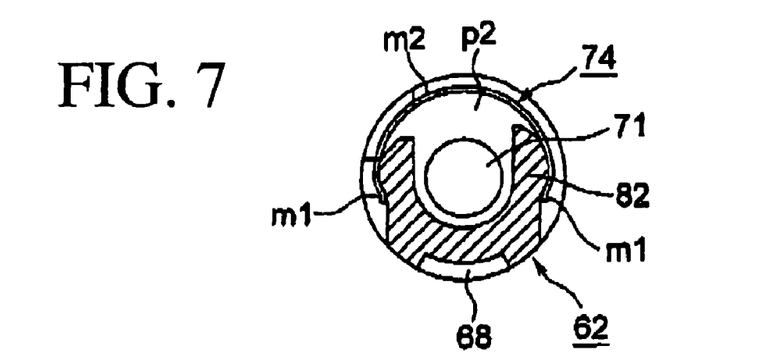
FIG. 7 is a cross-sectional view taken along line E-E in FIG. 6.
Figure 8:
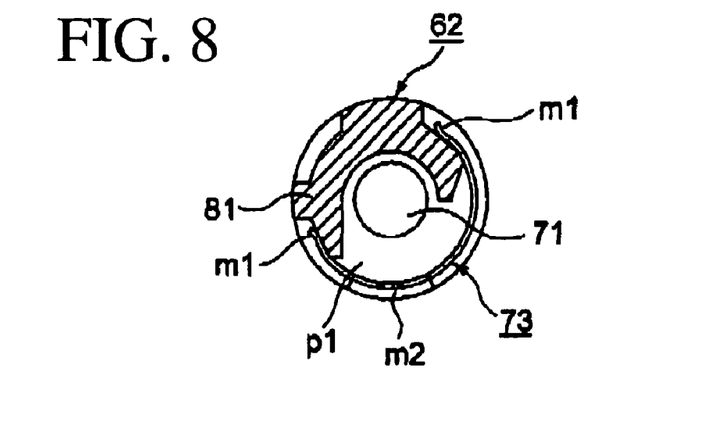
FIG. 8 is a cross-sectional view taken along line F-F in FIG. 6.

The linear solenoid valve 10 includes a linear solenoid portion 11 and a valve portion 12 which serves as a pressure regulating portion that is driven by the linear solenoid portion 11. The linear solenoid valve 10 is incorporated into a valve body, not shown in the drawing, with the linear solenoid portion 11 above the pressure regulating portion 12. The linear solenoid portion 11 includes an annular stationary core 15, a coil 17 around the stationary core 15 (bobbin), a movable iron core (armature) 54 which is free to advance and retreat (move left and right in the drawing) relative to the coil 17, a terminal 21 which supplies a current to the coil 17, and a yoke 20 serving as a tubular casing. The yoke 20 surrounds the stationary annular core 15, the coil 17, and the movable iron core 54.

The core 15 includes a tubular main body 16, and a flange portion 28 which projects radially outward from the front end (the left end in the drawing) of the main body 16. A central hole 18 extends through the main body 16. The main body 16 is axially longer than the coil 17 so that the rear end of the main body 16 (the right end in the drawing) projects rearward (toward the right in the drawing) from the rear end of the coil 17 by a predetermined length.

The movable iron core 54 includes an annular plunger 31, and a shaft 32 which is fitted and fixed within a hole formed in the center of the plunger 31. The plunger 31 includes a circular plate 35, and a cylindrical portion 36 integral with an outer peripheral portion of the circular plate 35 and extending from the circular plate toward the front (toward the left in the drawing). The shaft 32 extends through the central hole 18, and is slidably supported so as to be free to advance and retreat relative to the core 15 via bushes 19 disposed at the front end and rear end of the main body 16. An annular plate 33 of a non-magnetic material body is attached to a front surface (left surface in the drawing) of the circular plate 35 so as to surround the shaft 32, and serves to magnetically separate the core 15 from the plunger 31.

The yoke 20 has a tubular portion 55 and a circular base portion 56. A notch 57 is formed around the circumference of the front end of the tubular portion 55, and the terminal 21 is attached to the core 15 via this notch 57.

Further, the yoke 20 includes front end portion 80 bent around the front end of the tubular portion 55 (caulked). The linear solenoid portion 11 and the pressure regulating valve portion 12 are assembled into an integral unit by caulking end portion 80 to a flange 63 formed at the rear end of a sleeve 62, after the core 15, coil 17, and movable iron core 54 have been fitted into the yoke 20. By this assembling the rear end of a spool 26 of the pressure regulating valve portion 12 is brought into contact with the front end surface of the shaft 32.

The movable iron core 54 is shown in a limit retracted position in FIG. 1 and is caused to advance (move toward the left in the drawing) in an operational state.

A hole 30 is formed through the cylindrical portion 36 to provide fluid communication between the front and rear sides of the plunger 31. Therefore, as the movable iron core 54 moves, oil flows through the hole 30.

The pressure regulating valve portion 12 includes the sleeve 62, the spool 26, a retaining end plate 64 which is fixed to the front end of the sleeve 62 to retain the spool 26 within the sleeve 62, and a spring, not shown in the drawing, which is disposed between the end plate 64 and the front end of the spool 26 and serves to urge the spool 26 toward the rear (right side in FIG. 1). Together, the sleeve 62 and spool 26 constitute a valve body.

The spool 26 is slidably mounted within a central bore 71 in sleeve 62 so as to be free to advance and retreat within the sleeve 62. The spool 26, includes a spring seat at its front end, not shown in the drawing, which is inserted into the spring, and a plurality of lands formed in series to the rear of the spring seat.

The sleeve 62 includes an input port p1 to which an input pressure is supplied from the regulator valve (IN), an output port p2 for output of a control pressure to the hydraulic servo (OUT), a feedback port p3 for feeding back the output pressure, and drain ports p4, p5. The feedback port p3 communicates with the output port p2 via an oil passage, not shown in the drawing, formed in the outer periphery of the sleeve 62. The output pressure is supplied to the feedback port p3 as feedback pressure, whereby a force corresponding to the differential area of a predetermined land urges the spool 26 forward.

Therefore, the net thrust produced by forces received from the movable iron core 54, the spring, and the feedback pressure, brings the spool 26 into contact with the shaft 32, and causes the spool 26 to advance and retract integrally with movement of the movable iron core 54.

An oil retention space 68, having a fan shape, is provided adjacent to the input port p1, in the sleeve 62. Oil that enters the oil retention space 68 through the input port p1 flows to the drain port p4 through a gap between the sleeve 62 and the valve body, and at the same time, foreign matter, such as iron particulates, is retained in the oil retention space 68. A fan-shaped oil passage 69 connects the drain ports p4, p5 at the outer peripheral surface of the sleeve 62. Oil that is discharged through the drain port p5 reaches the drain port p4 through the oil passage 69 and is discharged from the linear solenoid valve 10 together with the oil that is discharged through the drain port p4.

Next, operation of the linear solenoid valve 10 will be described.

In the initial state when no current is supplied from the control device to the terminal 21, the movable iron core 54 is disposed in the limit retracted position in the linear solenoid portion 11 such that the rear end surface of the movable iron core 54 abuts against the base plate 56. Meanwhile, in the pressure regulating valve portion 12, the spool 26 is located in the limit retracted position by the load of the spring. At this time, the input port p1 and the output port p2 are in communication with each other, and the drain port p4 is closed. Therefore, an output pressure identical to the input pressure is output through the output port p2.

When a current is supplied from the control device to the coil 17 via the terminal 21, magnetic flux is generated, forming a magnetic path extending from the yoke 20 through the plunger 31 and the core 15 in sequence, and returning to the yoke 20. The portion of the magnetic path formed between the outer peripheral edge of the rear end of the main body 16 and the inner peripheral edge of the front end of the cylindrical portion 36 provides a magnetic force acting on the movable iron core 54.

The coil 17 thereby drives the movable iron core 54 with a predetermined magnetic force proportional to the current. As a result, a thrust is transmitted directly to the spool 26, causing it to advance (move to the left in FIG. 1), i.e. against the spring load, and the spring is thereby compressed. At this time, the output pressure is supplied to the feedback port p3 via a feedback oil path, and also urges the spool 26 to advance, applying a predetermined feedback force.

As a result, the input port p1 is throttled by the lands formed on the spool 26, and the output pressure is lowered, in accordance with a balancing of the thrust from the movable iron core 54, the feedback force, and the spring load applied to the spool 26.

When the current is further increased, the thrust acting on the spool 26 increases such that the spool 26 advances, so that the input port p1 is further throttled so that the output pressure is reduced to a minimum value.

On the other hand, when the current is decreased in the operational state, the thrust acting on the spool 26 decreases, causing the spool 26 to retract (move to the right in FIG. 1), and, as a result, the output pressure increases in inverse proportion to the amount of current.

When the current is decreased even further, the spool 26 retreats further, causing the input port p1 and output port p2 to come into communication with each other and the drain port p4 to close. An output pressure identical in value to the input pressure is then output through the output port p2.

When foreign matter enters the linear solenoid valve 10, the foreign matter may enter the gap between the sleeve 62 and spool 26, causing the linear solenoid valve 10 to become locked or damaged. In order to prevent the foreign matter from infiltrating the linear solenoid valve 10, strainers (filters) 73, 74 are attached to strainer receivers (mounts) 81, 82 formed in the sleeve 62 at the inlet port p1 and the outlet port p2. Note that under normal circumstances, backflowing oil may infiltrate the linear solenoid valve 10 from the outlet port p2, and therefore it is preferable that the strainer 74 be attached to the outlet port p2 in addition to the attachment of strainer 73 to inlet port p1.

The strainers 73, 74 are made from a material possessing elasticity, in this embodiment a metallic material, and are formed as arc-shaped strips which extend around a portion of the circumference of the valve sleeve 62 and to cover the inlet port p1 and outlet port p2. The strainers 73, 74 include engagement portions m1 at each end and a filter portion m2 extending between the engagement portions m1. The filter portion m2 is formed by an etching process and has a large number of holes with a diameter smaller than the dimensions of the foreign matter formed over its entire length. While in this embodiment, the filter portion m2 is formed by an etching process, it may be formed by a laser process.

Next, attachment of the strainers 73, 74 to the sleeve 62 will be described. In this embodiment, the strainers 73, 74 have identical structures and, therefore, only attachment of the strainer 73 to the strainer receiver 81 will be described with reference to FIGS. 9-11.

Figure 11:
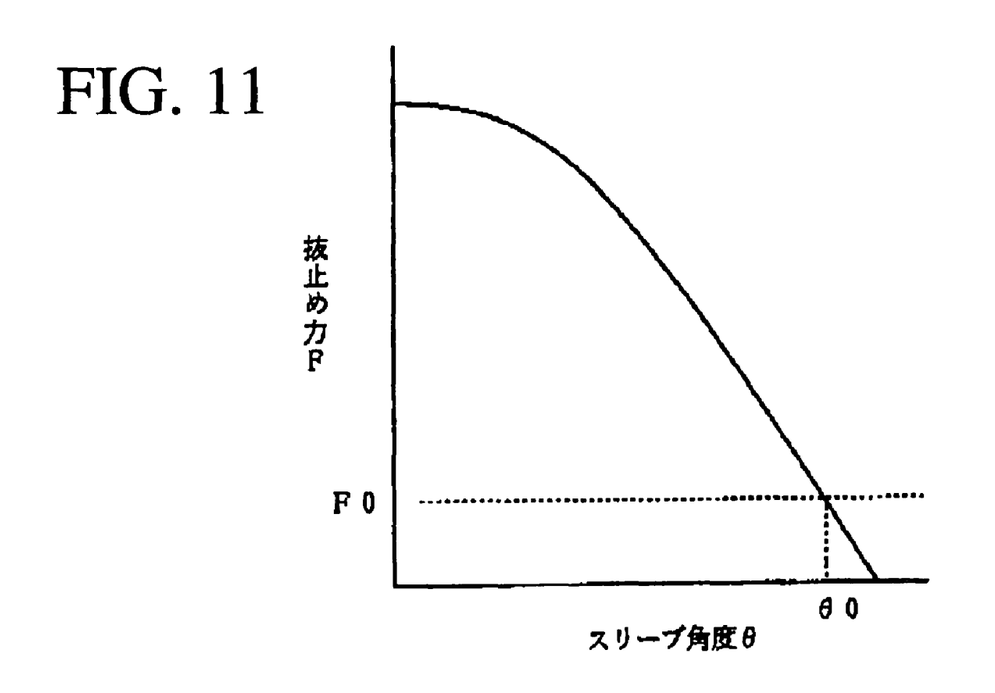
FIG. 11 is a graph illustrating the relationship between the sleeve angle of the engagement portion and retaining force in the first embodiment of the present invention.

Note that in FIG. 11, the abscissa gives the sleeve angle θ and the ordinate shows retaining force F.

Figure 9:
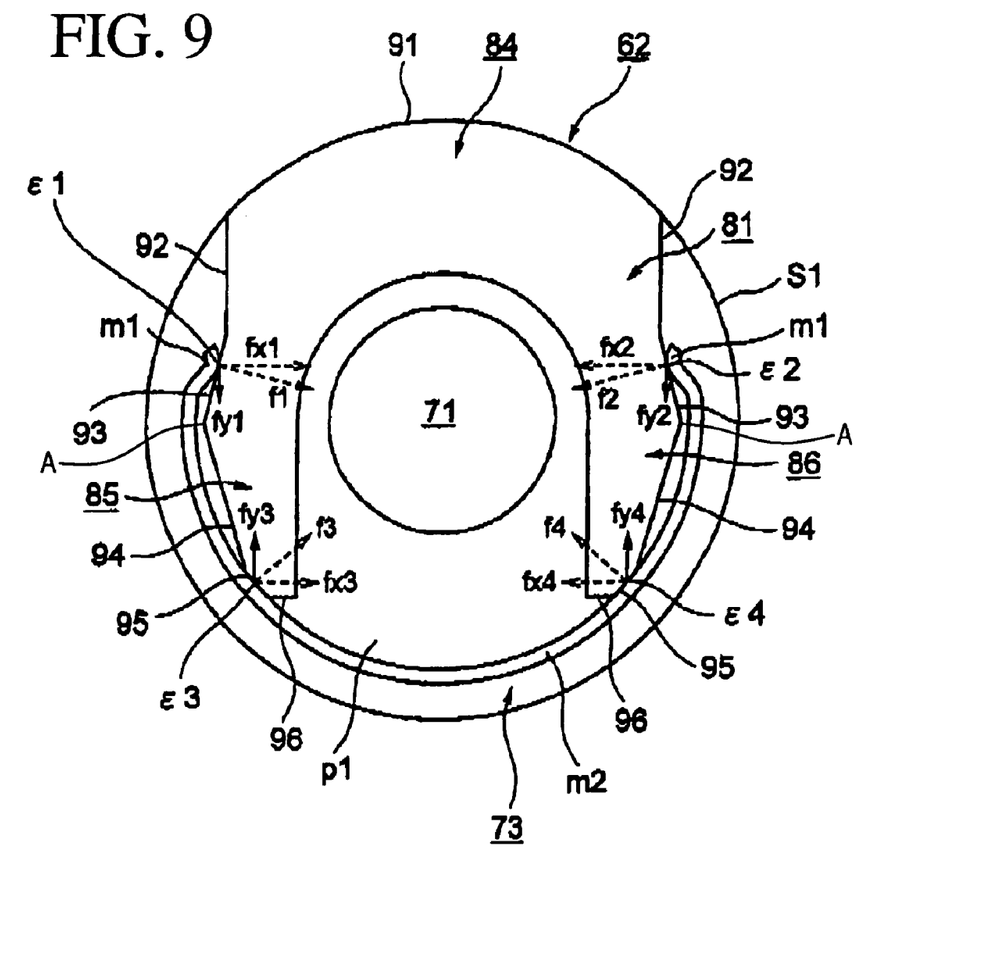
FIG. 9 is a cross-sectional view showing a strainer covering an inlet port according to the first embodiment of the present invention.

FIG. 9 shows sleeve 62 as having a circular outer peripheral surface S1, a central bore 71, and an inlet port p1 formed at a predetermined circumferential location in the sleeve 62 in communication with central bore 71. The strainer 73 is attached so as to cover the inlet port p1, and for this purpose, on both sides of the inlet port p1 are circumferential indents in the sleeve 62, radially inward of the outer peripheral surface S1. As a result, the strainer receiver (mount) 81 has a substantially U-shape.

The strainer receiver (mount) 81 includes a circular arc-shaped base portion 84, and a pair of arm portions 85, 86 extending parallel to each other tangentially of the hole 71, from each end of the base portion 84 and forming the inlet port p1. The outer peripheral surface of the strainer receiving portion 81 that constitutes a part of the outer peripheral surface S1 has, on its base portion 84 an arc-shaped first surface 91, second surface (reference surfaces) 92 that provide reference planes extending parallel with each other from the two opposing ends of the arc-shaped surface 91 toward the inlet port p1. Latching surfaces (third surfaces) 93 are provided on the arm portions 85 and 86 for latching the strainer 73 and are inclined relative to and extend from the front end of each reference surface 92 in a direction away from each other. Non-contact surfaces (fourth surfaces) 94 are inclined relative to and extend from the front end each of each latching surface 93 in a direction approaching each other. Contact surfaces 95 are formed as fifth surfaces (beveled portions) on arms 85, 86 and are inclined relative to and extend from non-contact surfaces 94 in a direction further approaching each other relative to the surfaces 94. Contact surfaces 94 are configured to contact the inner surface of the strainer 73. Non-contact surfaces (sixth surfaces) 96 extend inwardly from the front end of each contact surface 95 at right angles relative to the reference surfaces 92. Note that the circumferential length of the contact surface 95 is set to provide sealing to the greatest extent possible, by ensuring that no gaps are present between the inner surface of the strainer 73 and the contact surface 95. In the illustrated embodiment reference surfaces 92, latching surfaces 93, non-contact surfaces 94, and non-contact surfaces 96 are all planar surfaces, whereas contact surfaces 95 are curved, and the intersections therebetween are straight lines. Each of the latching surfaces 93 intersects a non-contact surface 94 at a linear apex A over which a strainer snaps with engagement portions coming to rest on latching surfaces 93.

As described above, the strainer 73 includes the engagement portions m1 and the filter portion m2. The engagement portion m1 is curved with a first radius of curvature and formed so as to project toward a latching surface 93, while the filter portion m2 has a circular arc shape, is curved with a second radius of curvature, and is formed so as to surround (cover) the latching surfaces 93, non-contact surfaces 94, contact surfaces 95, non-contact surfaces 96, and the inlet port p1. When the strainer 73 is not attached to the sleeve 62, its second radius of curvature is slightly smaller than the radius of curvature of the contact surfaces 95.

The strainer 73 is attached to the valve sleeve 62 by spring engagement of the respective engagement surfaces m1 with the latch surfaces 93 with spreading of the two ends by a predetermined amount, bringing the inner surface of the filter surfaces m2 into contact with the respective contact surfaces 95. In this process, the two ends of the strainer 73 are slightly spread, and thus the strainer 73 is deformed into a shape having a third radius of curvature, which is substantially equal to the radius of curvature of the contact surfaces 95.

Thus, the strainer 73 is biased into contact with the latching surfaces 93 by a predetermined spring force, and as a result of this spring force, the strainer 73 is pressed against the respective latching surfaces 93 and contact surfaces 95. As a result, first contact sites ∈1, ∈2, at which the engagement portions m1 contact the latching surfaces 93, are further from the inlet port p1 than the second contact sites ∈3, ∈4 at which a contacting portion of the filter portion m2 contacts the contact surfaces 95.

Incidentally, the first radius of curvature of the respective engagement portions m1 is sufficiently small for the engagement portions m1 to contact the latching surfaces 93 along substantially linear contact lines at the first contact sites ∈1, ∈2. Further, the contact surfaces 95 are slightly curved so as to project radially outward, and the radius of curvature thereof is equal to the third radius of curvature. Therefore, when the strainer 73 is attached to the sleeve 62, the inner surface of the filter portion m2 and the contact surfaces 95 contact each other at the second contact sites ∈3, ∈4.

Pressing forces f1, f2 by which the strainer 73 presses the strainer attachment portions 81 at the first contact sites ∈1, ∈2 are perpendicular to the latching surfaces 93, and pressing forces f3, f4 by which the strainer 73 presses the strainer attachment portions 81 at the second contact sites ∈3, ∈4 are perpendicular to the contact surfaces 95. Referring to the left-right direction in FIG. 9, the direction in which the engagement portions strainer 73 sandwich the strainer mount 81, as a sandwiching direction and to the up-down direction in FIG. 9, perpendicular to the sandwiching direction, as an attaching/detaching direction for the strainer 73, the components of the respective pressing forces f1, f2 in the sandwiching direction are fx1, fx2, the component forces of the respective pressing forces f1, f2 in the attaching/detaching direction are fy1, fy1, the component forces of the respective pressing forces f3, f4 in the sandwiching direction are fx3, fx4, and the component forces of the respective pressing forces 13, f4 in the attaching/detaching direction are fy3, fy4. The component forces fx1, fx2 oppose each other as do the component forces fx3, fx4. Moreover, the component forces fy1, fy3 and the component forces fx2, fx4 are mutually opposing and, as a result, the sealing is improved.

Further, when the strainer 73 is attached to the sleeve 62, the component forces fy1, fy2 generate a retaining force F for holding the strainer 73 on the sleeve 62, where $$F=fy1+fy2$$

Figure 10:
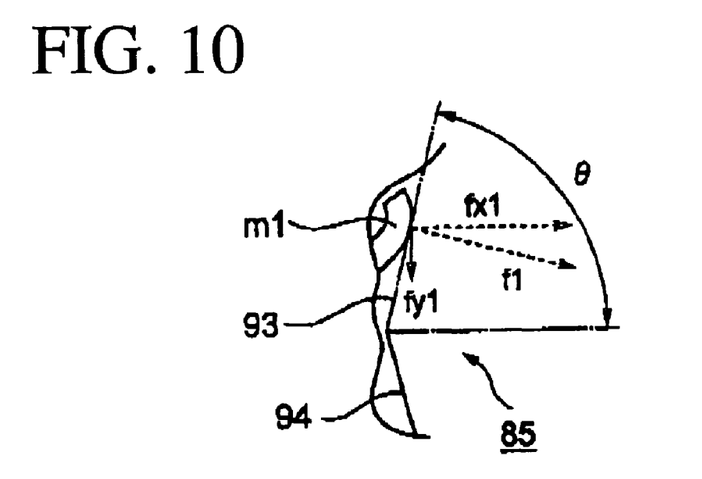
FIG. 10 is a view illustrating a sleeve angle of an engagement portion of a strainer according to the first embodiment of the present invention.

As shown in FIG. 11, the retaining force F is a function the angle θ formed by the latching surfaces 93 relative to the sandwiching direction, shown in FIG. 10. With reference to FIG. 11, assuming that the value at which the strainer 73 can no longer be maintained attached to the sleeve 62 is F0, the allowable value of the sleeve angle θ becomes θ0. Accordingly, the sleeve angle θ is set within a range of $$0 \leq \theta \leq \theta 0$$

Thus, in this embodiment, the respective engagement portions m1 contact the latching surfaces 93 on both sides of the inlet port p1, thereby forming the first contact sites ∈1, ∈2, and the surface of the filter portion m2 contacts the contact surfaces 95, thereby forming the contact sites ∈3, ∈4. A gap in which the strainer 73 and sleeve 62 do not contact extends between the first contact sites ∈1, ∈2 and second contact sites ∈3, ∈4. Therefore the sleeve 62 and strainer 73 contact each other at four locations. The contact between the sleeve 62 and the strainer 73 is sufficient at the first and second contact sites ∈1 to ∈4, to reliably seal the inlet port p1. As a result, no gap between the sleeve 62 and strainer 73 is in communication with the inlet port p1, and therefore foreign matter can be prevented from infiltrating the linear solenoid valve 10.

Furthermore, there is no need to strictly set the tolerance between the radial and axial dimensions of the strainer 73 and the axial and radial dimensions of the strainer attachment portion 81, and therefore the cost of the linear solenoid valve 10 can be reduced.

Figure 12:
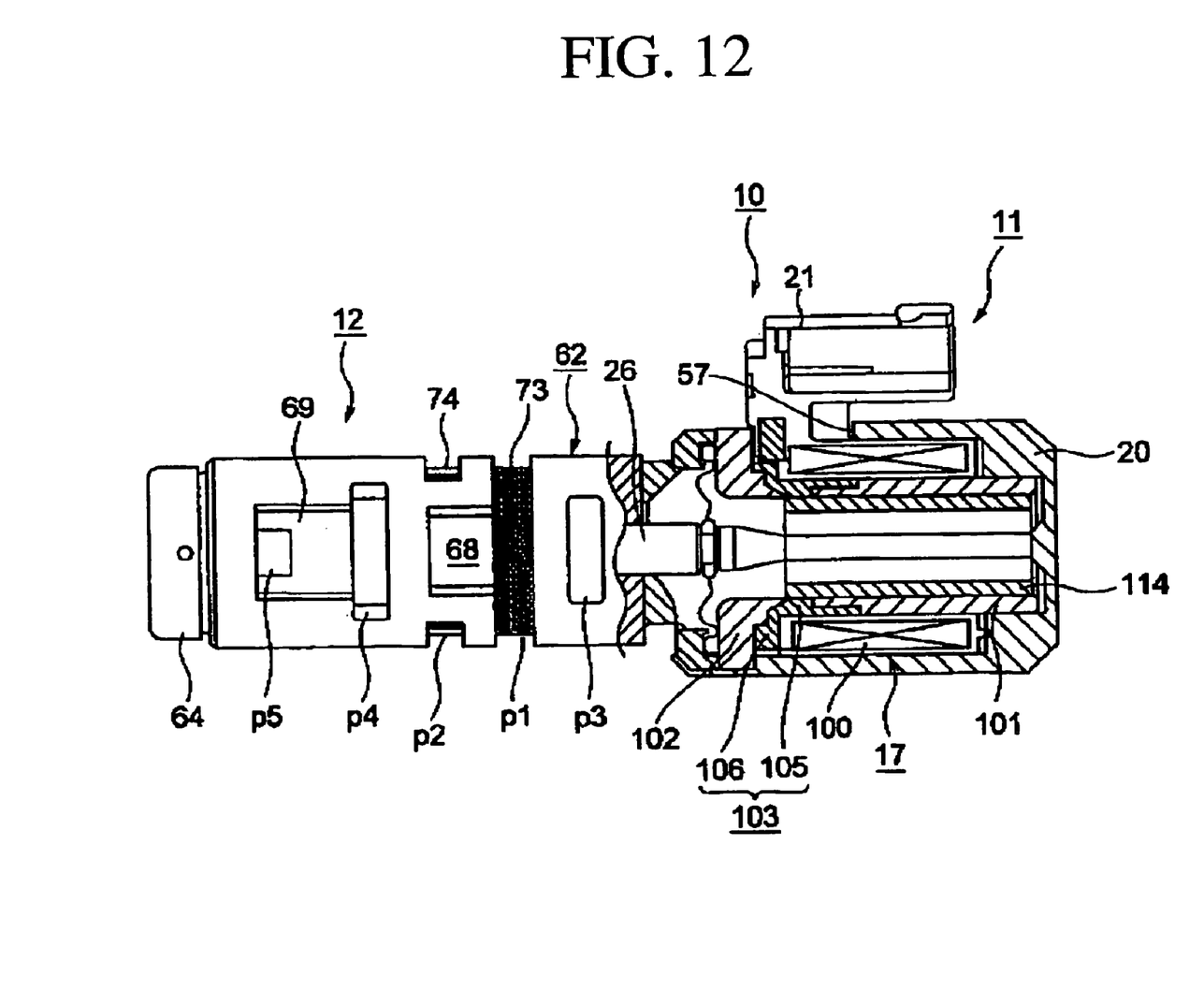
FIG. 12 is a front view of a linear solenoid valve according to a second embodiment of the present invention.

Next, a second embodiment of the present invention will be described with reference to FIG. 12. Note that elements having a structure identical to corresponding elements in the first embodiment have been allocated identical reference symbols, and description thereof has been omitted. The functions and effects of such identical elements are the same in both embodiments.

In the second embodiment, the coil 17 is formed of a winding 100. A tubular member 101 serves as a first end yoke and is disposed adjacent and radially inward of the coil 17, and extending rearward (toward the right in the drawing) from a predetermined position axially central of the coil 17. An annular end portion 102 serves as a second end yoke and is disposed adjacent the front end (the left end in the drawing) of the coil 17.

Further, a tubular body 103 including a tubular portion 105 and an annular flange portion 106, formed at the front end of the tubular portion 105 and extending radially outward, with the tubular portion 105 extending within the interior of the coil 17. A plunger 114 is mounted within tubular member 101 and tubular portion 105 for sliding movement left-right in the drawing, radially inward from the end portions 101, 102 and the tubular body 103.

Figure 13:
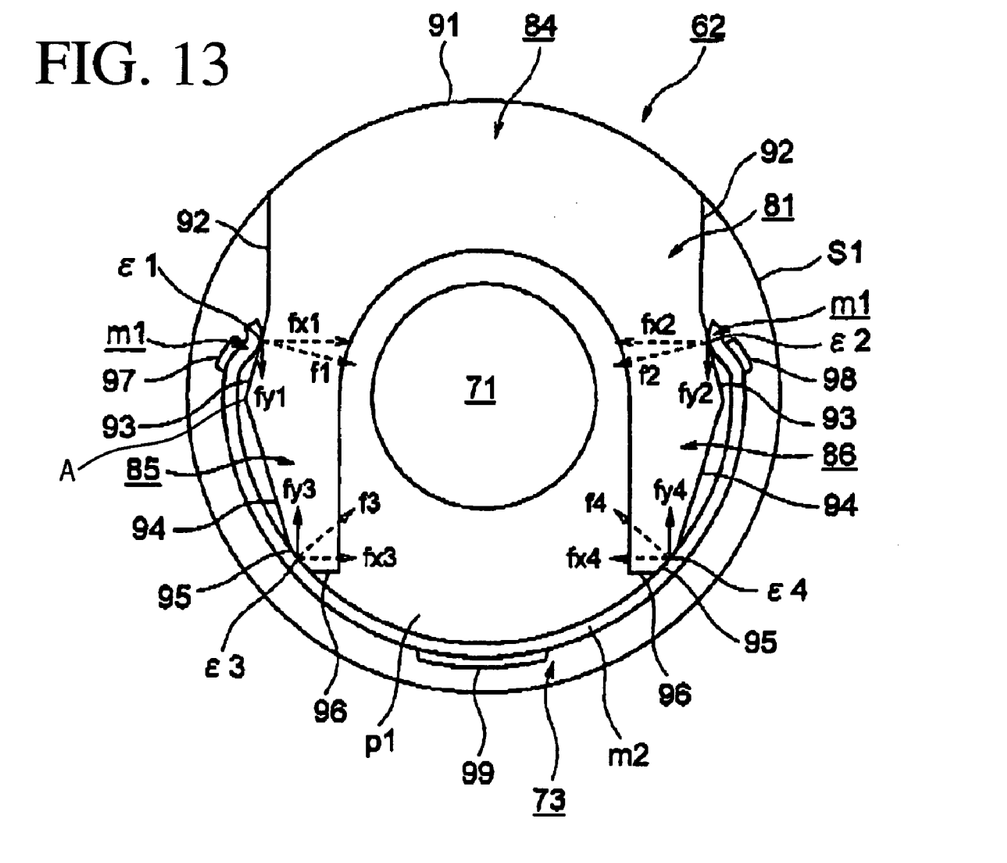
FIG. 13 is a cross-sectional view showing a strainer covering an inlet port according to a third embodiment of the present invention.

Next, a third embodiment of the present invention will be described with reference to FIG. 13. Note that members having a structure identical to corresponding members in the first embodiment have been allocated identical reference symbols, and description thereof has been omitted. The effects and functions of these identical structures are the same as in the first embodiment. In this embodiment, the strainers 73, 74 are structured identically, and therefore only the manner in which the strainer 73 is attached to the strainer attachment portion 81 will be described.

In this third embodiment, ribs 97, 98 serving as first reinforcement members are formed at a predetermined location on the outer surfaces of respective engagement portions m1. In this embodiment the predetermined location is where the engagement portion curves inward, and the ribs 97, 98 project radially outward. The ribs 97, 98 extend over a predetermined length of the circumferential dimension of the strainer 73, and serve to increase the strength of the engagement portions m1 and thereby prevent deformation of the engagement portions m1. As a result, the retaining force F is increased.

A second reinforcing rib 99 is formed substantially central of the circumferential dimension of the strainer 73. The rib 99 is formed over a predetermined circumferential length of the strainer 73, and serves to increase the strength of the central part of the strainer 73, thereby preventing the central part of the strainer 73 from deforming such that the contact portions separate from the contact surfaces 95. As a result, the inlet port p1 is reliably sealed.

The ribs 97 to 99 are formed by press-forming after a large number of holes have been formed in the filter portion m2 by an etching process or a laser process.

Figure 14:
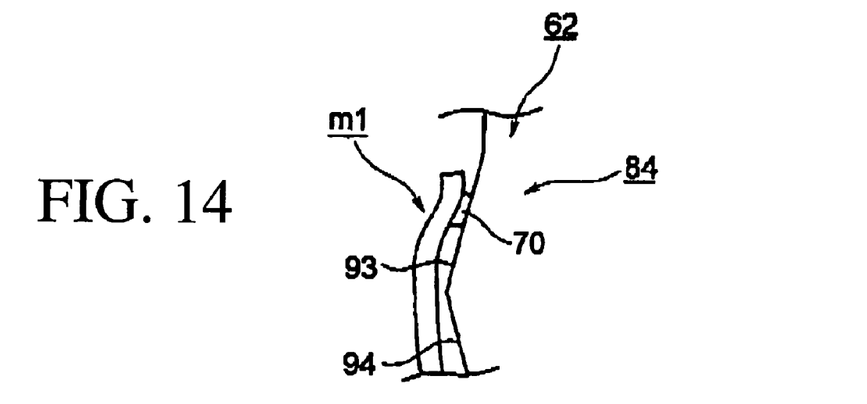
FIG. 14 is a partial sectional view showing an engagement portion of a strainer according to a fourth embodiment of the present invention.

Next, a fourth embodiment of the present invention will be described with reference to FIG. 14. Note that members having structures identical to corresponding members of the first embodiment have been allocated identical reference symbols, and description thereof has been omitted. The effects and functions of these identical structures are the same as those of the corresponding members in the first embodiment.

In this fourth embodiment, a projection 70 is formed on each engagement portion m1 so as to extend radially inward. Therefore, the strainers 73 (FIG. 1), 74 can be easily processed. The projecting portion 70 is formed by a press-forming process after a large number of holes have been formed in the filter portion m2 by an etching process or a laser process.

Note that the present invention is not limited to the embodiments described above, and may be subjected to various modifications based on the spirit of the present invention, such modifications remaining within the scope of the present invention.

The present invention may be applied to any strainer for a control valve in a hydraulic circuit of an automatic transmission.

The invention claimed is:

1. A control valve comprising:
    a valve sleeve with a strainer attachment body portion comprising:
        an arc-shaped first surface that constitutes a part of an outer peripheral surface of the body portion;
        second surfaces providing reference planes and respectively extending, in parallel with each other toward a port, from two opposing ends of the arc-shaped first surface to second surface front ends;
        third surfaces respectively extending from the second surface front ends to third surface front ends and inclined to the second surface front ends in directions away from each other;
        fourth surfaces respectively extending from the third surface front ends to fourth surface front ends and inclined to the third surface front ends in directions approaching each other; and
        fifth surfaces respectively extending from the fourth surface front ends and more inclined toward each other than the fourth surfaces; and
    a valve spool slidably mounted within the valve sleeve so as to be free to advance and retreat within the sleeve, and
    a strainer, attached to the strainer attachment portion, comprising:
        engagement portions located at distal ends of the strainer and respectively contacting the third surfaces formed on the strainer attachment portion; and
        contact portions respectively contacting the fifth surfaces; and
        wherein the contact of the strainer with the third and fifth surfaces seals the strainer to the strainer attachment body portion of the valve sleeve to prevent foreign matter from entering the control valve.

2. The control valve according to claim 1, wherein the contact portion is at a predetermined location between the two ends of the strainer, and second contact sites are on surfaces which are tapered toward each other.

3. The control valve according to claim 2, wherein a retaining force generated as a vector of the of a pressing force with which the strainer presses against the strainer attachment portion is a function of an angle of the tapered surfaces.

4. The control valve according to claim 2, wherein the positions of the first and second contact sites are set such that force vectors of respective pressing forces by which the strainer presses the first and second contact sites oppose each other from opposing sides of the port.

5. The control valve according to claim 1, wherein the strainer is made of a metallic material and has a filter portion formed by chemical or laser etching.

6. The control valve according to claim 1, wherein at least one reinforcement rib is formed on the engagement portion.

7. The control valve according to claim 1, wherein at least one reinforcement rib is formed in a circumferentially central part of the strainer.

8. The control valve according to claim 1 wherein the strainer, fully seated on the strainer attachment body portion of the valve sleeve, does not contact the fourth surfaces.

9. The control valve according to claim 8 wherein the second, third and fourth surfaces are planar and the fifth surfaces are curved.

10. The control valve according to claim 1 wherein the second, third and fourth surfaces are planar and the fifth surfaces are curved.

11. The control valve according to claim 9 wherein the engagement portions of the strainer respectively press against the third surfaces with forces perpendicular to the third surfaces and the strainer presses against the fifth surfaces with forces perpendicular to the fifth surfaces.

12. The control valve according to claim 8 wherein the engagement portions of the strainer respectively press against the third surfaces with forces perpendicular to the third surfaces and the strainer presses against the fifth surfaces with forces perpendicular to the fifth surfaces.

13. The control valve according to claim 1 wherein the engagement portions of the strainer respectively press against the third surfaces with forces perpendicular to the third surfaces and the strainer presses against the fifth surfaces with forces perpendicular to the fifth surfaces.

* * * * *